S. ADAMS.
Attaching Hubs to Axles.
No. 5,426.  Patented Feb. 1, 1848.
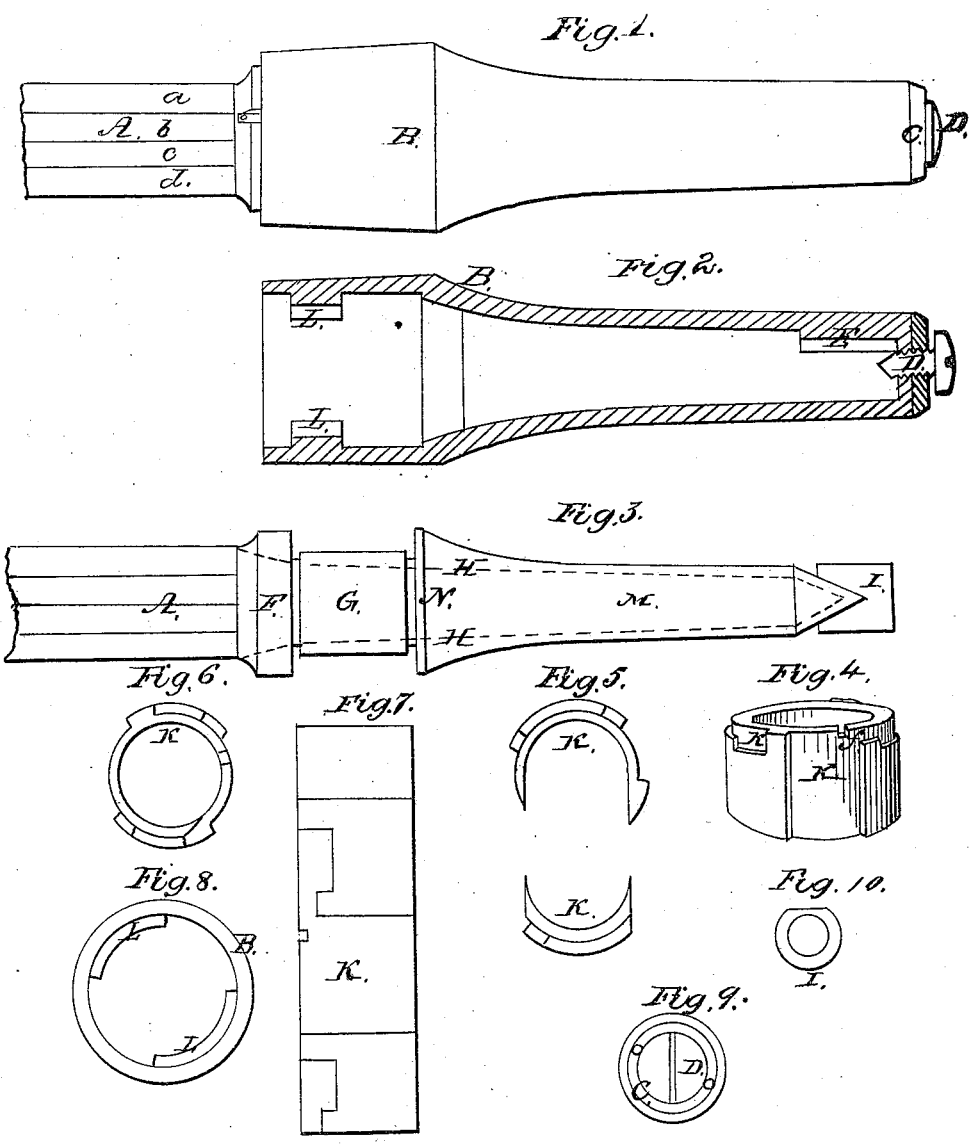

UNITED STATES PATENT OFFICE.

SAMUEL ADAMS, OF NEW YORK, N. Y., ASSIGNOR TO THO. I. SLOAN AND WM. F. LEGGETT.

AXLE FOR CARRIAGES.

Specification of Letters Patent No. 5,426, dated February 1, 1848.

*To all whom it may concern:*

Be it known that I, SAMUEL ADAMS, of the city, county, and State of New York, have invented new and useful Improvement in Axles for Carriages, and that the following is a full, clear, and exact description of the principle or character which distinguishes them from all other things before known and of the manner of making, constructing, and using the same, reference being had to the accompanying drawings, making part of this specification, in which—

Figure 1 is a plan of the box on the arm of the axle; Fig. 2, is a section through the box; Fig. 3, is the arm of the axle, Figs. 4, 5, and 6, the "journal box"; Fig. 7, diagram showing the outer surface of the journal box displayed; Fig. 8, the inner end of the pipe box (B); Fig. 9, the outer end of the pipe box (B), showing the set screw (D) and nut (C); Fig. 10, inner end of the socket piece (I) (Fig. 3).

My improvements are as follows: Onto the arms of a wrought iron axle I cast a shell which forms the journal and is chilled so as to wear a greater length of time than the ordinary axle, and the box is fastened on to the axle in such a way as to be set up till it runs steady, and is easily detached while it is not liable to come off by accident.

The construction is as follows: The axle (a) is formed of one or more bars of wrought iron, or it may consist of bars of different kinds of iron or steel or other metal (a, b, c, d) to reduce the danger of breaking. The whole of the outside of the arm part of the axle is chill-cast iron (M), this is cast upon the core of wrought iron, shown by the dotted lines (H, H) of Fig. 3; the outer end of the arm when complete is conical, and the inner end is enlarged into a flanch (N) behind which there is a recess (G) and then another flanch (F); at either end of the cylindrical recess (G) there is a small groove for the purpose of holding oil &c. The box (B) is made to fit the arm from the flanch (N) to the base of the cone above named from which it extends out cylindrically a sufficient distance to receive a socket piece (I) into which when in place the end of the conical part of the arm fits, this socket is prevented from turning in the box by a feather (E) cast on the side thereof. In the outer end of the box there is a set screw (D) for the purpose of setting up said socket against the end of the axle as hereafter described. The inner end of the box is enlarged so as to go over the flanches (F) and (N) and near the end on the inside are two projections (L, L). On the recess (G) I fit a ring (Fig. 4) which I denominate a "journal box"; it is made in two parts, as clearly shown in Figs. 5 and 6, so that it can be put on or removed from the recess (G) at pleasure; on its outside are two grooves (K) running from end to end and near one end there are notches (k) cut. When this box is in its place in the recess (G) the box (B) (which is wedged into the hub of the wheel in the ordinary way) is slid onto the arm; the projections (L, L) slide along the groove (K) above named, the journal box is prevented from turning by means of a piece of iron which is slipped in through a notch (e) (see Fig. 1) in the flanch (F) into a notch (f) in the box, and the outer box (B) is turned till the projections (L, L) are opposite the notches (k) the set screw (D) is then turned till the projections are brought up to their place and the wheel is so fastened onto the axle as to prevent the possibility of its being removed without starting back the set screw (D) which is held to its place by an independent nut (C).

What I claim as my invention and desire to secure by Letters Patent, is—

1. Forming the recess (G) in the journal or arm of the axle in combination with the journal box, constructed in the manner and for the purpose above described.

2. I also claim the employment of the socket (I) and set screw in combination with the journal box and projections (L) for fastening the wheel to the axle, as hereinbefore made known.

SAML. ADAMS.

Witnesses:
SAML. LEGGETT,
WM. H. GRISWOLD.